(12) United States Patent
Pasad

(10) Patent No.: US 11,722,285 B1
(45) Date of Patent: *Aug. 8, 2023

(54) METHODS AND APPARATUS FOR SEARCHING AND TRACKING INTERCELL INTERFERENCE IN COMMUNICATION NETWORKS

(71) Applicant: Marvell Asia Pte, Ltd., Singapore (SG)

(72) Inventor: Kalpendu Pasad, Cupertino, CA (US)

(73) Assignee: Marvell Asia Pte, Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,096

(22) Filed: Sep. 12, 2022

Related U.S. Application Data

(63) Continuation of application No. 17/356,290, filed on Jun. 23, 2021, now Pat. No. 11,489,647.

(60) Provisional application No. 63/043,001, filed on Jun. 23, 2020.

(51) Int. Cl.
| | |
|---|---|
| H04L 5/00 | (2006.01) |
| H04B 17/10 | (2015.01) |
| H04B 7/0426 | (2017.01) |
| H04B 17/345 | (2015.01) |
| H04W 72/541 | (2023.01) |

(52) U.S. Cl.
CPC ......... *H04L 5/0073* (2013.01); *H04B 7/0434* (2013.01); *H04B 17/102* (2015.01); *H04B 17/345* (2015.01); *H04W 72/541* (2023.01)

(58) Field of Classification Search
CPC ............................. H04L 5/0073; H04B 17/102
See application file for complete search history.

(56) References Cited

U.S. PATENT DOCUMENTS

| | | | | |
|---|---|---|---|---|
| 2013/0088986 A1* | 4/2013 | Xiao | .................... | H04B 7/0456 370/252 |
| 2015/0215014 A1* | 7/2015 | Zhu | ..................... | H04L 25/0204 375/267 |

* cited by examiner

*Primary Examiner* — Sulaiman Nooristany
(74) *Attorney, Agent, or Firm* — JW Law Group; James M. Wu

(57) ABSTRACT

Methods and apparatus are disclosed for searching and tracking intercell interference in communication networks. In an exemplary embodiment, a method is provided that includes operations of receiving a noise covariance matrix and generating a beam sub-space from the noise covariance matrix. The beam sub-space includes one or more sub-space beams. The method also includes determining a set of selected sub-space beams having energy levels that exceed a threshold, calculating an Eigenvector decomposition for the set of selected sub-space beams to identify an Eigenspace of interference energy, and tracking the Eigenspace over time.

18 Claims, 5 Drawing Sheets

METHODS AND APPARATUS FOR SEARCHING AND TRACKING INTERCELL INTERFERENCE IN COMMUNICATION NETWORKS

PRIORITY

This patent application is a continuation patent application of a co-pending U.S. patent application having a U.S. patent application Ser. No. 17/356,290, filed on Jun. 23, 2021 in the name of the same inventor and entitled "Methods and Apparatus for Searching and Tracking Intercell Interference in Communication Networks," which further claims the benefit under 35 U.S.C. § 119 of U.S. Provisional Patent Application No. 63/043,001 filed on Jun. 23, 2020 and entitled "Low Complexity Search and Track Algorithm for Intercell Interference in 5G Networks," all of which are hereby incorporated herein by reference in their entirety.

FIELD

The exemplary embodiments of the present invention relate to telecommunications networks. More specifically, the exemplary embodiments of the present invention relate to receiving and processing data streams transmitted over a wireless communication network.

BACKGROUND

High speed communication networks, such as multiple-input-multiple-output (MIMO) communication networks are becoming increasingly utilized to provide high speed data transmission between user equipment. For example, in a MIMO system, a transmitter utilizes multiple transmit antennas and a receiver utilizes multiple receive antennas.

In a MIMO receiver, a channel response can be measured for each path from a transmit antenna to a receive antenna to form an M×N channel matrix. In this case, to find the best performing equalizer (spatial equalizer/beamformer), the second order statistics (covariance matrix) of the received signals are analyzed.

Intercell interference is a severe performance limiter and occurs when a base station receives transmissions from user equipment outside the current cell. For example, the dense deployment of fifth generation (5G) networks makes them highly susceptible to intercell interference. Detection of intercell interference (ICI) provides large benefits by allowing interference aware scheduling as well as improved baseband performance via model parameter optimization. Unfortunately, the very high computational requirements for interference measurements render them impractical.

SUMMARY

In various exemplary embodiments, methods and apparatus are disclosed for searching and tracking intercell interference in a communication network. In an exemplary embodiment, an interference searching and tracking circuit (ISTC) operates to exploit the highly directional nature of millimeter (mm) wave technology to provide a dramatic reduction in the complexity of intercell interference measurements (IIM). The ISTC also provides an algorithm that generates tracking information, which provides real-time interference location information for use by a receiver scheduler. In addition, the location based information can be used to reduce further the complexity of the IIM.

In an exemplary embodiment, a method is provided that includes operations of operations of receiving a noise covariance matrix and generating a beam sub-space from the noise covariance matrix. The beam sub-space includes one or more sub-space beams. The method also includes determining a set of selected sub-space beams having energy levels that exceed a threshold, calculating an Eigenvector decomposition for the set of selected sub-space beams to identify an Eigenspace of interference energy, and tracking the Eigenspace over time.

In an exemplary embodiment, apparatus is provided that comprises a processor and a memory configured to perform operations comprising: a processor and a memory configured to perform intercell interference tracking comprising operations of: receiving a noise covariance matrix; generating a beam sub-space from the noise covariance matrix, wherein the beam sub-space includes one or more sub-space beams; determining a set of selected sub-space beams having energy levels that exceed a threshold; calculating an Eigenvector decomposition for the set of selected sub-space beams to identify an Eigenspace of interference energy; and tracking the Eigenspace over time.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
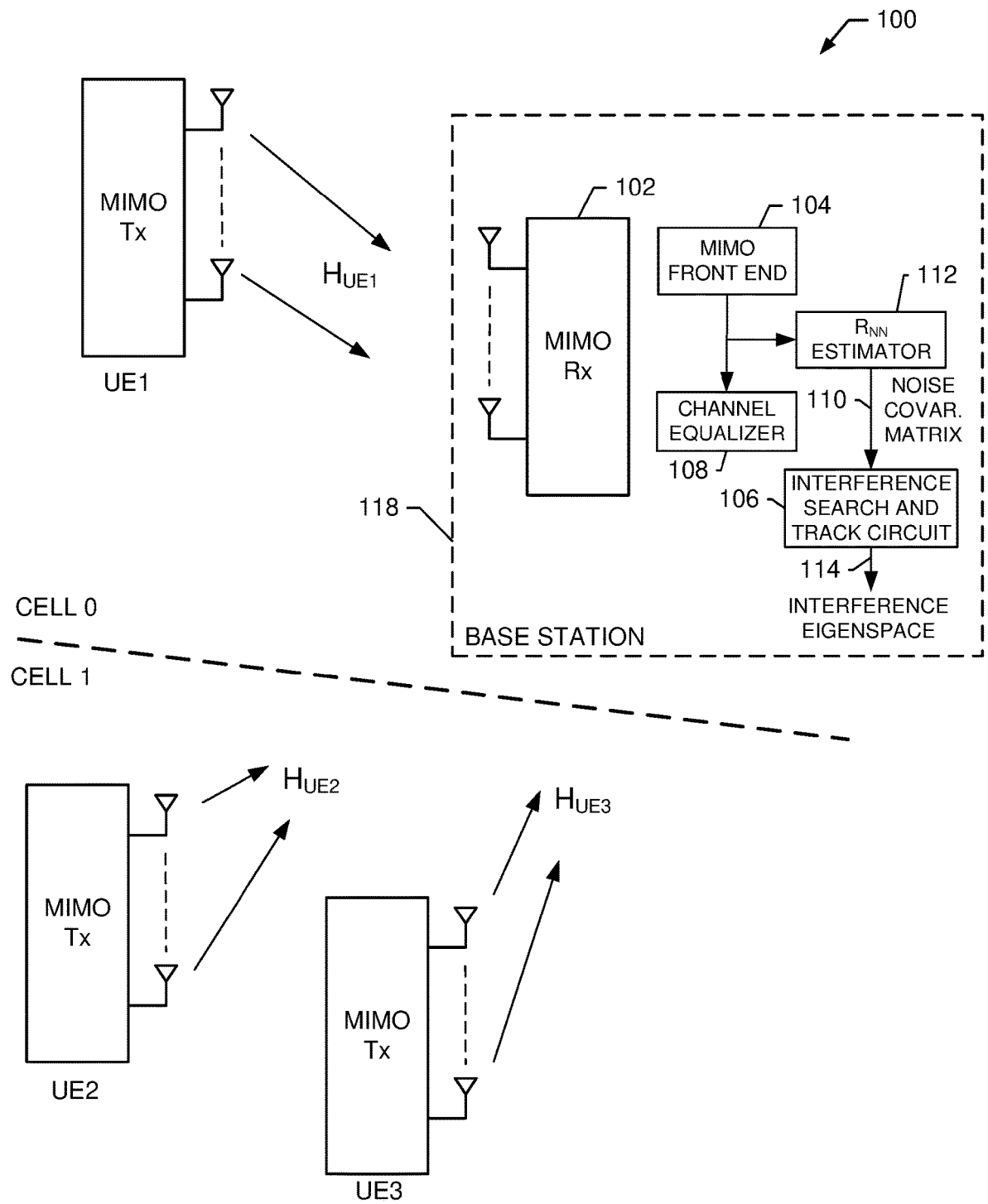
FIG. 1 shows a communication network comprising a MIMO receiver having an exemplary embodiment of an interference search and tracking circuit.

In various exemplary embodiments, methods and apparatus for interference searching and tracking in a communication network are disclosed.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It is understood that in the development of any such actual implementation, numerous implementation-specific decisions may be made in order to achieve the developer's specific goals, such as compliance with application and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of the embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

FIG. 1 shows a communication network 100 comprising two communication cells (CELL 0 and CELL 1). The CELL 0 includes a base station 118 that comprises an exemplary embodiment of an interference search and track circuit (ISTC) 106. The base station 118 also includes a MIMO receiver 102, a front end 104, channel equalizer 108, and noise covariance ($R_{NN}$) estimator 112. The CELL 0 also includes a first user equipment (UE1) that communicates with the base station 118. The CELL 1 includes a second user equipment (UE2) and a third user equipment (UE3).

During operation, UE1 transmits signals to the base station 118 over channel $H_{UE1}$. The base station 118 also receives transmissions from UE2 and UE3 of CELL 1 over channels $H_{UE2}$ and $H_{UE3}$, respectively. The transmission received at the base station 118 from UE2 and UE3 represent intercell interference and may prevent the base station 118 from successfully receiving the transmissions from UE1.

The MIMO front end 104 receives the transmitted signals from the three UE and passes these signals to the channel equalizer 108 and the $R_{NN}$ estimator 112. The $R_{NN}$ estimator 112 generates a received noise covariance matrix 110. Any signals representing intercell interference received from UE1 or UE2 will appear in the noise covariance matrix 110. In various embodiments, the ISTC 106 searches the noise covariance matrix 110 to find interfering signals and then tracks the locations or directions of the interfering signals. The locations 114 of the tracked interference are output to the channel equalizer 108, which uses the interference locations to obtain the best receiver performance.

In various embodiments, the communication network 100 comprises a fourth generation (4G) long term evolution (LTE) or fifth generation (5G) new radio (NR) communication network. Aspects of the invention are also suitable for use with other types of communication networks. A more detailed description of the implementation and operation of the ISTC 106 are provided below.

Figure 2:
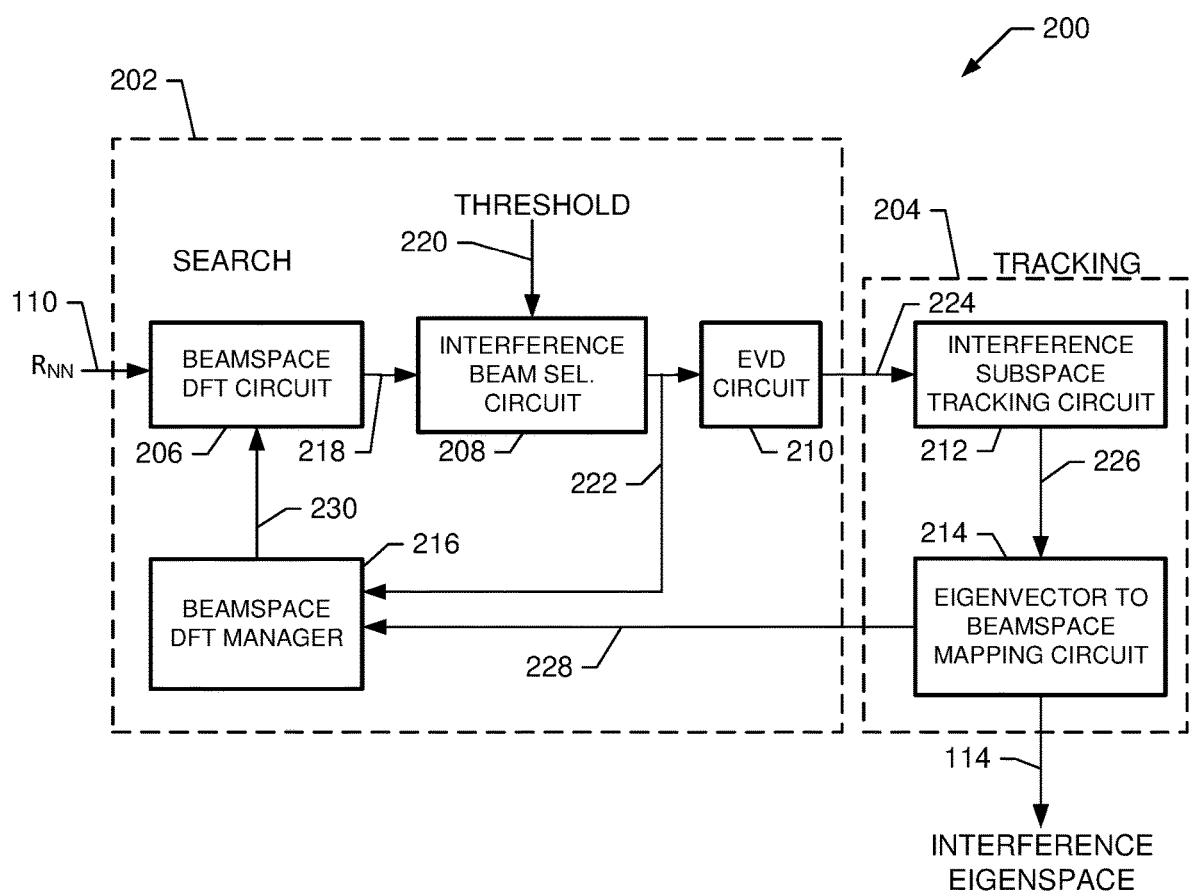
FIG. 2 shows an exemplary embodiment of an interference search and tracking circuit.

FIG. 2 shows an exemplary embodiment of an interference search and tracking circuit 200. The ISTC 200 is suitable for use as the ISTC 106 shown in FIG. 1. In an embodiment, the ISTC 200 comprises beamspace discrete Fourier transform (DFT) circuit 206, interference beam selection circuit 208, Eigenvalue decomposition (EVD) circuit 210, interference subspace tracking circuit 212, Eigenvector to beamspace mapping circuit 214, and beamspace DFT manager 216.

In an embodiment, the beamspace DFT circuit 206 receives the input noise covariance matrix ($R_{NN}$) 110. The DFT circuit 206 processes the input noise covariance matrix 110 to generate a set of coarse DFT beams 218 that contain the energy of interfering UE's. Due to the finite resolution of the DFT beamspace operation, the energy of the interference from UE1 and UE2 is not localized within the boundaries of DFT beam created by the beam space operation DFT. The energy will decay over several adjacent beams.

In an embodiment, the interference beam selection circuit 208 receives the beamspace 218 and compares the beams to a threshold level 220 to determine beams that have energy that exceed the threshold level 220. The beams having energy that exceed the threshold are output as coarse subspace beams 222. These beams meet the energy requirements and are passed to the EVD circuit 210 for fine beamspace estimation. Information about the coarse subspace beams 222 is also passed to the beamspace DFT manager 216.

In an embodiment, the EVD circuit 210 performs an Eigenvalue decomposition on the coarse subspace beams 222 to determine associated Eigenvectors that identify a fine beamspace. The operation of the EVD circuit 210 represents a fine search and is performed quickly since the coarse subspace being processed (e.g., coarse subspace beams 222) is much smaller than the subspace spanned by the complete noise covariance matrix 110. The determined Eigenvalues 224 are passed to the interference and subspace tracking circuit 212 of the tracking system 204.

In an embodiment, the interference and subspace tracking circuit 212 tracks the received Eigenvectors 224 and outputs Eigenspace information 226 that is input to the Eigenvector to beamspace mapping circuit 214. As the interfering UEs move, the subspace of the interference determined by the interference and subspace tracking circuit 212 will correspondingly change.

In an embodiment, the Eigenvector to beamspace mapping circuit 214 receives the Eigenspace information 226 and maps this information to DFT beamspace 228. The output of the circuit 214 is a DFT beamspace 228 that represent the coarse beam equivalent of the Eigenspace that is currently tracked by the tracking circuit 212. The circuit 214 also outputs the interference Eigenspace 114 to other entities at the receiver.

In an embodiment, the beamspace DFT manager 216 receives the tracked DFT beamspace information 228 and the original DFT beams 222 and determines adjustment to the coarse beam searching of the beamspace DFT circuit 206. In an embodiment, beamspace coarse adjustments 230 are output from the manager 216 and input to the DFT circuit 206.

Accordingly, various embodiments of the ISTC circuit 200 perform one or more of the following operations to provide fast intercell interference searching and tracking.

A. Receiving a noise covariance matrix ($R_{NN}$) 110 containing energy from one or more intercell interferers.

B. Performing a coarse search of a selected beamspace to determine an amount of energy within a set of coarse DFT beams 218.

C. Determining a DFT beam subspace (e.g., coarse subspace beams 222) that includes one or more groups of beams containing energy greater than a threshold level.

D. Performing an Eigenvalue decomposition on the coarse subspace beams 222 determined in C above, to determine Eigenvectors 224 of the interfering energy, which can be referred as an Eigenspace.

E. Tracking the movement of the Eigenvectors (e.g., operation of interference subspace tracking circuit 212).

F. Mapping the movement of the Eigenvectors to DFT beamspace beam identifiers 228.

G. Updating the beamspace that is coarsely searched based on the beam identifiers. For example, the beamspace DFT manager 216 performs this operation and generates update beamspace coarse adjustments 230.

In various exemplary embodiments, the ISTC circuit 200 performs intercell searching and tracking while providing at least the following advantages.

A. Performs a fast initial coarse beamspace search to determine a DFT beam subspace of beams having a select amount of interfering energy.

B. Performs an Eigenvalue decomposition on a much smaller DFT beam subspace to determine Eigenvectors of the interfering energy.

C. Tracks the determined Eigenvectors instead of continually recalculating Eigenvectors as the source of interference moves.

D. Updates the beamspace that is coarsely searched based on the tracking results.

Figure 3:
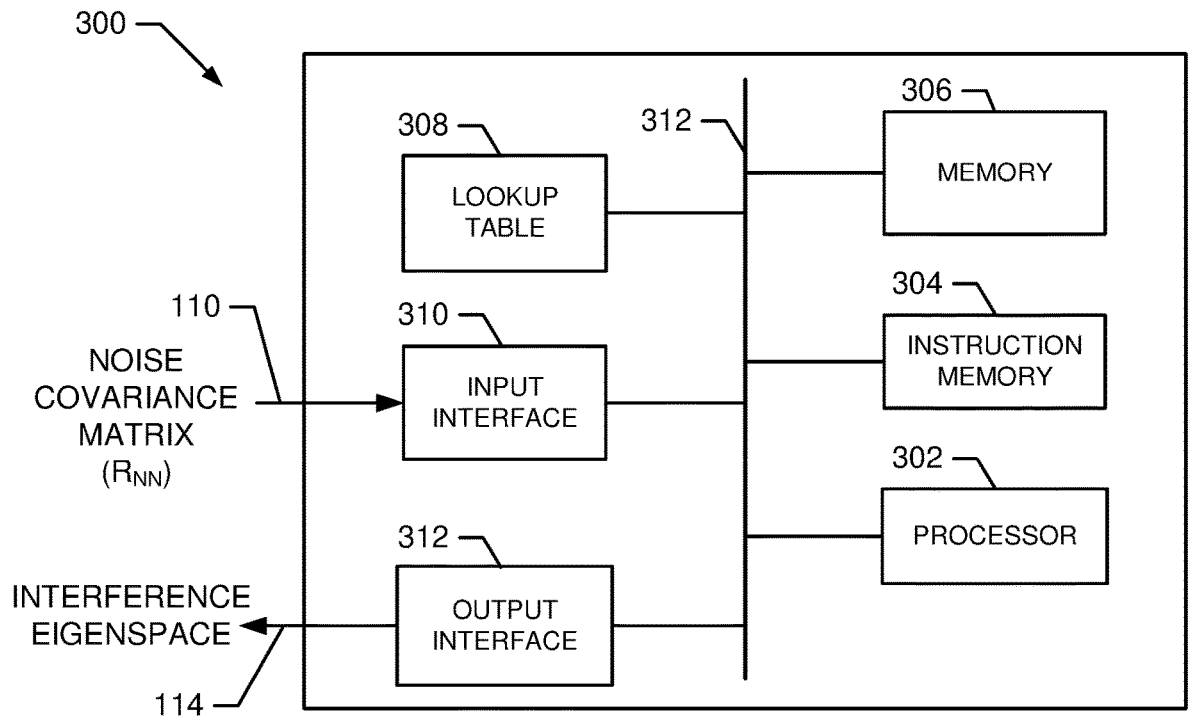
FIG. 3 shows another exemplary embodiment of an interference search and tracking circuit.

FIG. 3 shows an exemplary embodiment of an ISTC 300. For example, the ISTC 300 is suitable for use as the ISTC 106 shown in FIG. 1. In an embodiment, the ISTC 300 comprises processor 302, instructions 304, memory 306, lookup table 308, input interface 310, and output interface 312, all coupled to communicate over bus 312.

In an embodiment, input noise covariance matrix 110 comprising received uplink transmissions from user equipment is received by the input interface 310. The input interface 310 buffers the received channel matrix 110 in the memory 306 for processing by the processor 302.

In an embodiment, the processor 302 executes the instructions 304 to perform intercell interference searching and tracking as described herein. For example, the processor 302 performs at least the following operations.

A. Receives a noise covariance matrix ($R_{NN}$) 110 containing energy from one or more intercell interferers.

B. Performing a coarse search of a selected beamspace to determine an amount of energy within a set of coarse DFT beams. For example, the processor 302 performs a DFT on the received noise matrix 110 to determine the coarse DFT beams 218.

C. Determines a DFT beam subspace (e.g., coarse subspace beams 222) that includes one or more groups of beams containing energy greater than a threshold level. For example, the threshold is stored in the lookup table 308 and the processor 302 obtains this threshold to compare to the beam energy to determine the DFT beam subspace 222.

D. Performs an Eigenvalue decomposition on the coarse subspace beams 222 determined in C above, to determine Eigenvectors 224 of the interfering energy, which can be referred as an Eigenspace. For example, the processor 302 performs the Eigenvalue decomposition to determine Eigenvectors associated with the intercell interference. In an embodiment, the processor 302 utilizes the lookup table 308 to obtain stored values (e.g., sin, cosine, etc.) to improve the speed of the decomposition.

E. Tracks the movement of the Eigenvectors (e.g., similar to operation of interference subspace tracking circuit 212). In an embodiment, the processor 302 tracks the movement of the eigenvectors, which represents the movement of the interfering sources.

F. Maps the movement of the Eigenvectors to DFT beamspace beam identifiers 228. In an embodiment, the processor 302 maps the Eigenvectors direction to beams in the beamspace.

G. Updates the beamspace that is coarsely searched based on the mapped beam identifiers. In an embodiment, the processor 302 updates the beamspace that is coarsely searched based on the beam identifiers.

Thus, the ISTC 300 operates to search and track intercell interference in a communication network.

Figure 4:
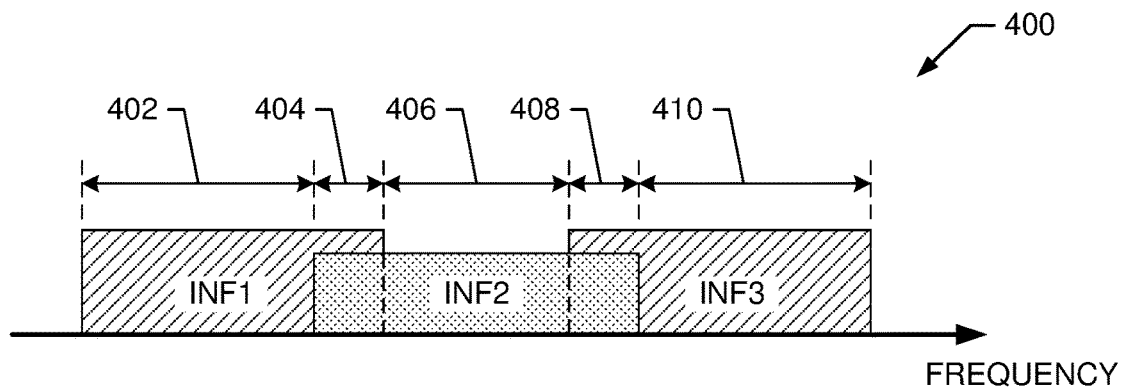
FIG. 4 shows a diagram that illustrates the operation of embodiments of the interference search and tracking circuit.

FIG. 4 shows a diagram that illustrates the operation of embodiments of the interference search and tracking circuits 106, 200, and 300. During the interval 402, the ISTC 106 tracks the location (e.g., direction) of a first interferer (INF1). During the interval 404, the ISTC 106 tracks the location (e.g., direction) of first and second interferers (INF1 and INF2). During the interval 406, the ISTC 106 tracks the location (e.g., direction) of INF2. During the interval 408, the ISTC 106 tracks the location (e.g., direction) of INF2 and a third interferer (INF3). During the interval 410, the ISTC 106 tracks the location (e.g., direction) of INF3. Thus, embodiments of the interference search and tracking circuit 106 operate to search a received noise covariance matrix for interfering signals and maintain a track list that identifies interfering signals whose locations are being tracked. In an embodiment, the processor 302 maintains the track list in the memory 306.

Figure 5:
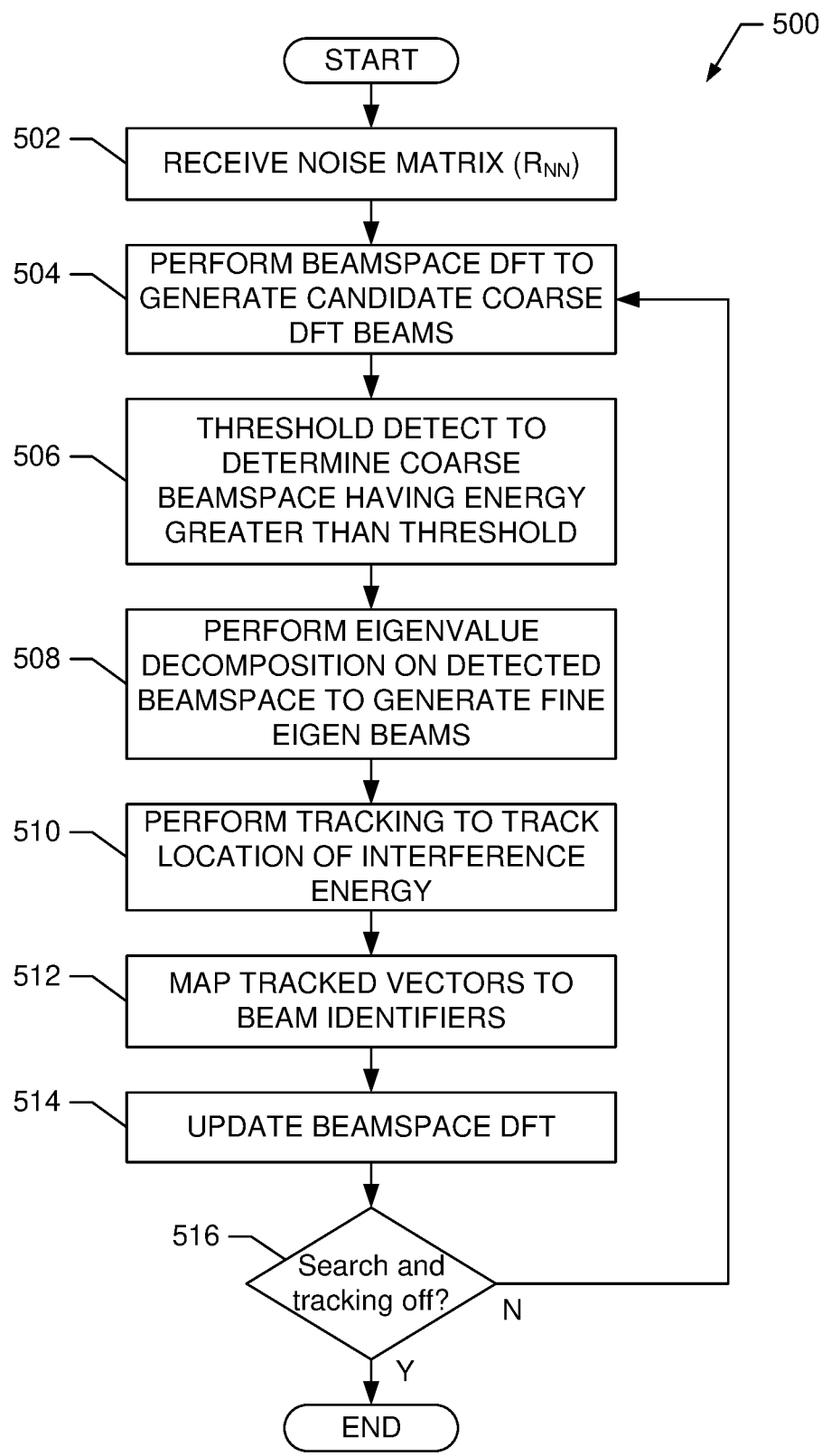
FIG. 5 shows a method for interference searching and tracking in accordance with embodiments of the invention.

FIG. 5 shows a method 500 for intercell interference searching and tracking in in accordance with embodiments of the present invention. For example, the method 500 is performed by the ISTC 200 shown in FIG. 2 or the apparatus 300 shown in FIG. 3.

At block 502, an input noise covariance matrix ($R_{NN}$) is received. For example, the $R_{NN}$ 110 is received and comprises energy from intercell interferers, such as UE2 and/or UE3.

At block 504, a beamspace DFT is performed to generate coarse DFT beams having corresponding energy levels. For example, the beamspace DFT circuit 206 performs this operation to generate the coarse DFT beamspace 218.

At block 506, a threshold detection is performed on the beamspace to determine beam subspace having energy levels greater than a threshold level. For example, the beam selection circuit 208 performs this operation to generate the coarse subspace beams 222 having energy levels greater than the threshold.

At block 508, an Eigenvalue decomposition is performed on the subspace to determine Eigenvectors. For example, the EVD circuit 210 performs this operation on the subspace beams 222 to generate the Eigenvectors 224.

At block 510, tracking of the Eigenvectors is performed and a track list is maintained to track location and/or direction of intercell interference energy. For example, the tracking circuit 212 performs this operation to generate interference Eigenspace information 226. In an embodiment, the processor 302 maintains the track list in the memory 306.

At block 512, the tracked interference Eigenspace information is mapped to beam identifiers in the beamspace. For example, the mapping circuit 214 performs this operation to generate the tracked DFT beamspace information 228.

At block 514, the coarse beamspace DFT is updated based on tracked DFT beamspace information 228. For example, the DFT manager 216 performs this operation to update the DFT circuit 206.

At block 516, a determination is made as to whether interference searching and tracking should continue. If searching and tracking is to continue, the method proceeds to block 504. Otherwise, the method ends.

Thus, the method 500 operates to perform searching and tracking of intercell interference in a communication system. It should be noted that the method 500 is exemplary and that the operations may be rearranged, added to, deleted, combined, or otherwise modified within the scope of the embodiments.

Figure 6:
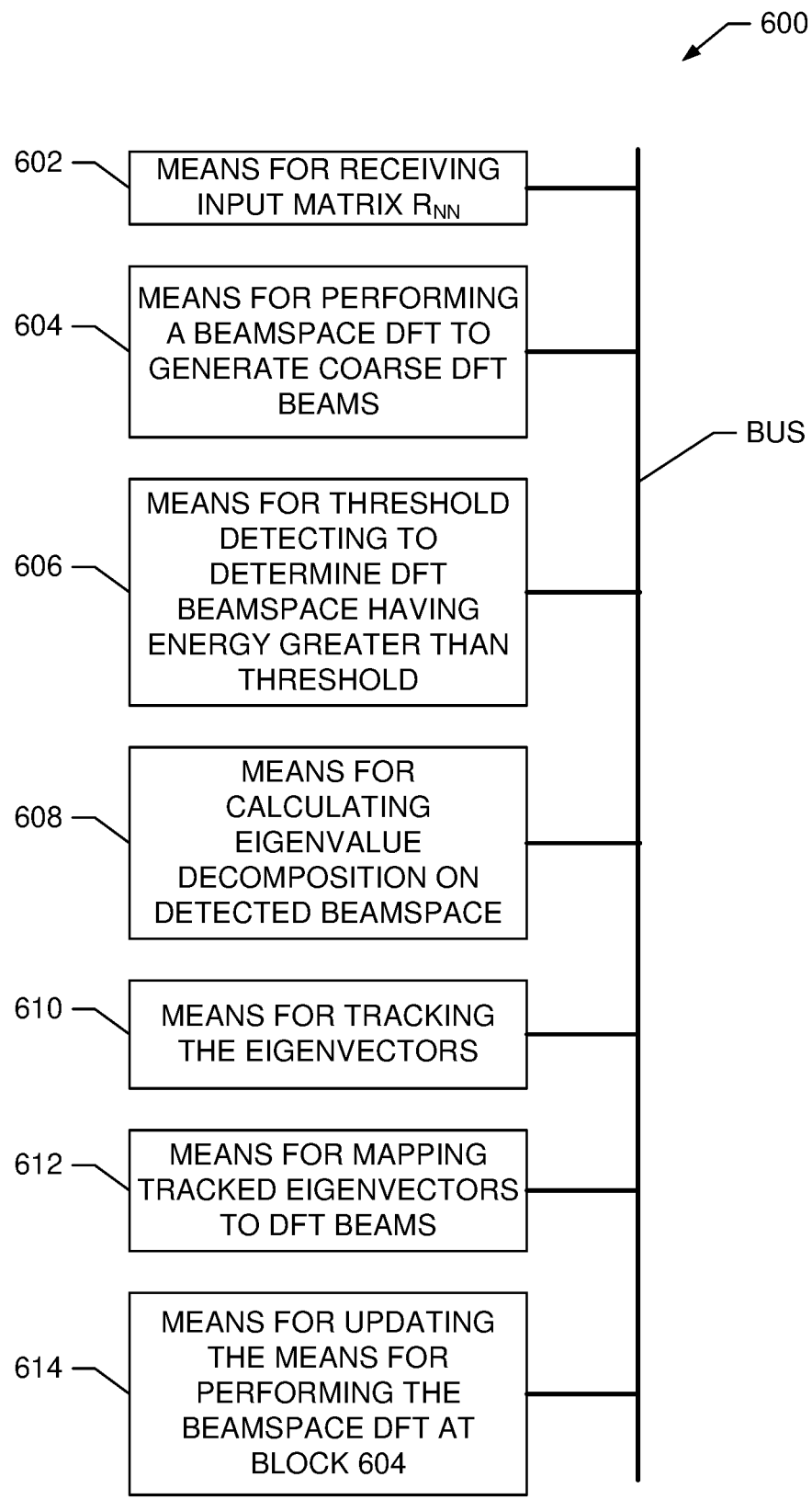
FIG. 6 shows an exemplary embodiment of an interference search and tracking apparatus.

FIG. 6 shows an exemplary embodiment of an interference search and tracking apparatus 600. The interference search and tracking apparatus 600 is suitable for use as the interference search and tracking circuit 106 shown in FIG. 1.

In an embodiment, the interference search and tracking apparatus 600 comprises means 602 for receiving a noise covariance matrix ($R_{NN}$), which in an embodiment comprises the beamspace DFT circuit 206. The interference search and tracking apparatus 600 also comprises means 604 for performing a beamspace DFT to generate coarse DFT beams, which in an embodiment comprises the beamspace DFT circuit 206. The interference search and tracking apparatus 600 also comprises means 606 for threshold detecting the coarse DFT beams to determine a beamspace having energy greater than threshold, which in an embodiment comprises the beam selection circuit 208. The interference search and tracking apparatus 600 also comprises means 608 for calculating an Eigenvalue decomposition on the detected beamspace, which in an embodiment comprises the EVD circuit 210. The interference search and tracking apparatus 600 also comprises means 610 for tracking the Eigenvectors, which in an embodiment comprises the interference subspace tracking circuit 212. The interference search and tracking apparatus 600 also comprises means 612 for mapping the tracked Eigenvectors to beam identifiers, which in an embodiment comprises the beamspace mapping circuit 214. The interference search and tracking apparatus 600 also comprises means 614 for updating the means for performing the beamspace DFT, which in an embodiment comprises the beamspace DFT manager 216.

While particular embodiments of the present invention have been shown and described, it will be obvious to those skilled in the art that, based upon the teachings herein, changes and modifications may be made without departing from this exemplary embodiments of the present invention and its broader aspects. Therefore, the appended claims are intended to encompass within their scope all such changes and modifications as are within the true spirit and scope of these exemplary embodiments.

What is claimed is:

1. An apparatus able to identify and track interfering signals in a communication network, comprising:
   a beamspace discrete Fourier transform ("DFT") circuit configured to generate a set of beams in according with a noise covariance matrix;
   an interference beam selection circuit coupled to the beamspace DFT circuit and operable to identify coarse subspace beams that contain energy levels exceed a predefined threshold energy level in accordance with the set of beams;
   a beamspace manager coupled to the interference beam selection circuit and configured to generate beamspace coarse adjustments in response to the coarse subspace beams; and
   an Eigenvalue decomposition ("EVD") circuit coupled to the interference beam selection circuit and configured to determine Eigenvalues based on the coarse subspace beams.

2. The apparatus of claim 1, further comprising an interference subspace tracking circuit coupled to the EVD circuit and configured to generate Eigenspace information in response to the Eigenvalues from the EVD circuit.

3. The apparatus of claim 2, further comprising an Eigenvector to beamspace mapping circuit coupled to the interference subspace tracking circuit and configured to provide interference Eigenspace based on the Eigenspace information.

4. The apparatus of claim 2, further comprising an Eigenvector to beamspace mapping circuit coupled to the interference subspace tracking circuit and configured to provide a DFT beamspace based on the Eigenspace information.

5. The apparatus of claim 4, wherein the beamspace manager is configured to generate the beam space coarse adjustments in response to the DFT beamspace.

6. The apparatus of claim 1, wherein the beamspace DFT circuit is configured to generate coarse DFT beams in according with the noise covariance matrix and the beamspace coarse adjustments.

7. The apparatus of claim 2, wherein the interference subspace tracking circuit is configured to tracking movement of Eigenvectors.

8. The apparatus of claim 4, wherein the Eigenvector to beamspace mapping circuit is able to provide locations of tracked interference for enhancing receiver performance.

9. The apparatus of claim 4, wherein the Eigenvector to beamspace mapping circuit processes and forwards interference locations to a channel equalizer.

10. A method of interference search and track for identifying interfering signals in a communication network, comprising:
    generating, by a beamspace discrete Fourier transform ("DFT") block, a set of beams in according with received noise covariance matrix;
    identifying, by an interference beam selection block, coarse subspace beams having energy levels exceed a threshold in accordance with the set of beams; and
    determining, by a beamspace manager, beamspace coarse adjustments in response to the coarse subspace beams;
    outputting Eigenspace of interference energy, by an Eigenvector to beamspace mapping block; and
    providing, by an Eigenvalue decomposition ("EVD") block coupled to the interference beam selection block, Eigenvalues based on the coarse subspace beams.

11. The method of claim 10, further comprising generating Eigenspace information in response to the Eigenvalues.

12. The method of claim 11, further comprising providing interference Eigenspace based on the Eigenspace information.

13. The method of claim 11, further comprising providing a DFT beamspace based on the Eigenspace information.

14. The method of claim 10, further comprising performing a beam space discrete Fourier transform ("DFT") on the noise covariance matrix to generate the beam sub-space.

15. The method of claim 10, further comprising comparing energy level of each sub-space beam to the threshold.

16. The method of claim 10, further comprising mapping the Eigenspace of interference energy to mapped sub-space beams.

17. The method of claim 16, further comprising updating the one or more sub-space beams with the mapped sub-space beams.

18. The method of claim 17, further comprising determining, calculating, and tracking based on the updated set of selected sub-space beams.

* * * * *